(12) United States Patent
Yajima et al.

(10) Patent No.: US 9,019,907 B2
(45) Date of Patent: Apr. 28, 2015

(54) RADIO BASE STATION

(75) Inventors: Tatsuro Yajima, Kawasaki (JP); Akihito Hanaki, Yokohama (JP); Hidehiko Oyane, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 319 days.

(21) Appl. No.: 13/266,904

(22) PCT Filed: Apr. 28, 2010

(86) PCT No.: PCT/JP2010/057630
§ 371 (c)(1),
(2), (4) Date: Oct. 28, 2011

(87) PCT Pub. No.: WO2010/126114
PCT Pub. Date: Nov. 4, 2010

(65) Prior Publication Data
US 2012/0051308 A1  Mar. 1, 2012

(30) Foreign Application Priority Data

Apr. 28, 2009 (JP) ................. 2009-110009

(51) Int. Cl.
*H04W 4/00* (2009.01)
*H04W 72/12* (2009.01)
(Continued)

(52) U.S. Cl.
CPC .......... *H04W 72/1268* (2013.01); *H04W 72/14* (2013.01); *H04W 72/1284* (2013.01); *H04W 28/0278* (2013.01); *H04W 88/08* (2013.01)

(58) Field of Classification Search
CPC ... H04W 52/146; H04W 72/12; H04W 72/14; H04W 72/1263; H04W 72/04; H04W 72/1284; H04W 72/1268; H04W 74/08; H04W 74/0866; H04W 28/0278; H04L 49/254
USPC ......... 370/230, 322, 329, 335, 336, 338, 412, 370/443, 341, 447, 461, 462; 455/509, 450
See application file for complete search history.

(56) References Cited

U.S. PATENT DOCUMENTS 6,519,461 B1  2/2003  Andersson et al.
6,754,189 B1  6/2004  Cloutier et al.
(Continued)

FOREIGN PATENT DOCUMENTS

JP  2000 316035  11/2000
JP  2003 513534  4/2003
(Continued)

OTHER PUBLICATIONS

International Search Report Issued Aug. 3, 2010 in PCT/JP10/057630 Filed Apr. 28, 2010.
(Continued)

*Primary Examiner* — Kwang B Yao
*Assistant Examiner* — Harun Chowdhury
(74) *Attorney, Agent, or Firm* — Oblon, McClelland, Maier & Neustadt, L.L.P.

(57) ABSTRACT

A radio base station BTS includes an estimation unit 13 configured to estimate a time when a buffer of a scheduled mobile station UE becomes empty based on a remaining amount of data in the buffer of the mobile station UE, the remaining amount reported by the mobile station, and a sending unit 15 configured to send the mobile station UE a Zero Grant instructing to stop transmission of a data signal via an E-DPDCH based on the estimated time.

4 Claims, 2 Drawing Sheets

(51) Int. Cl.
*H04W 72/14* (2009.01)
*H04W 28/02* (2009.01)
*H04W 88/08* (2009.01)

(56) References Cited

U.S. PATENT DOCUMENTS

| | | | |
|---|---|---|---|
| 2008/0049669 A1* | 2/2008 | Lundby et al. | 370/329 |
| 2008/0318607 A1* | 12/2008 | Torsner et al. | 455/509 |
| 2009/0143071 A1* | 6/2009 | Bergstrom et al. | 455/450 |
| 2010/0074230 A1 | 3/2010 | Ishii et al. | |

FOREIGN PATENT DOCUMENTS

| | | |
|---|---|---|
| JP | 2006 060789 | 3/2006 |
| WO | 2008 108143 | 9/2008 |

OTHER PUBLICATIONS

Office Action issued Sep. 4, 2013 in Chinese Patent Application No. 201080019017.1 (with English translation).

Office Action issued Apr. 1, 2014, in Chinese Patent Application No. 201080019017.1 with English translation.

* cited by examiner

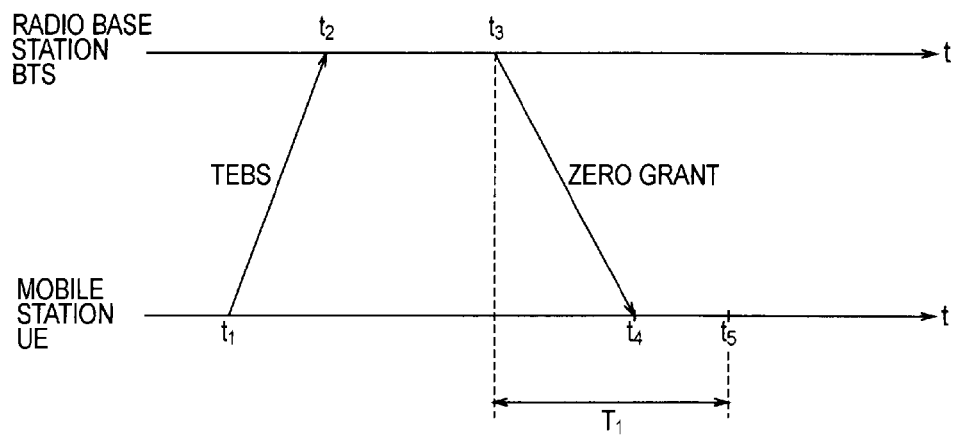
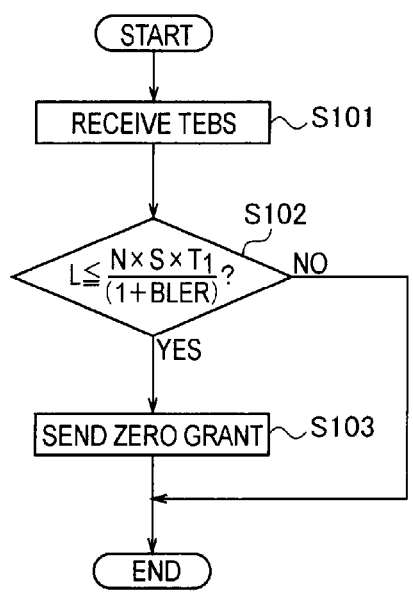

RADIO BASE STATION

TECHNICAL FIELD

The present invention relates to a radio base station.

BACKGROUND ART

The 3GPP defines a high-speed uplink communication which is referred to as "EUL (Enhanced Uplink)" or "HSUPA (High-Speed Uplink Packet Access)".

In EUL, a mobile station UE is configured to send a data signal (MAC-e PDU) to a radio base station NodeB via E-DP-DCH (E-DCH Dedicated Physical Data Channel).

Specifically, in EUL, the radio base station NodeB is configured to determine a mobile station UE to be scheduled for each time slot (TTI: Transmission Time Interval) and send a scheduling grant information (AG: Absolute Grant or RG: Relative Grant) to the scheduled mobile station.

Also, the mobile station scheduled in each TTI is configured to send MAC-e PDUs with TBS (Transport Block Size) according to the scheduling grant information (AG) received from the radio base station NodeB via the E-DPDCH.

Here, the mobile station scheduled in each TTI is configured to send MAC-e PDUs via the E-DPDCH with transmission power (or transmission amplitude) determined based on a "transmission power ratio (or transmission amplitude ratio) between the E-DPDCH and a general uplink communication control channel (DPCCH: Dedicated Physical Control Channel)" according to the AG.

In addition, in EUL of the "Time and Rate" system, only one mobile station UE is treated as a mobile station scheduled in each scheduling assignment period.

Also, in EUL of the "Time and Rate" system, the radio base station NodeB is configured to send a "Zero Grant (a first scheduling grant information)" to a mobile station UE currently scheduled at the time of switching between mobile stations UE to be scheduled, so that transmission of MAC-e PDUs via the E-DPDCH can be stopped.

However, in EUL of the "Time and Rate" system, even when a buffer of the currently scheduled mobile station becomes empty, the radio base station NodeB cannot switch the mobile stations to be scheduled until the radio base station NodeB receives "TEBS (Total E-DCH Buffer Status)" showing that the buffer is empty. Thus, there is a problem that a time period in which none of mobile stations UE sends MAC-e PDUs occurs to decrease utilization efficiency of the system.

SUMMARY OF THE INVENTION

A radio base station according to the first feature includes an estimation unit configured to estimate a time when a buffer of a scheduled mobile station becomes empty based on a remaining amount of data in the buffer of the mobile station, the residual amount reported by the mobile station, and a sending unit configured to send the mobile station a first scheduling grant information instructing to stop transmission of a data signal via an enhanced-dedicated physical data channel based on the estimated time.

BRIEF DESCRIPTION OF THE DRAWINGS

FIG. 3 is a sequence diagram showing an operation of the mobile communication system according to the first embodiment of the invention.

FIG. 4 is a flowchart showing an operation of the radio base station according to the first embodiment of the invention.

MODES FOR CARRYING OUT THE INVENTION (Configuration of a Mobile Communication System According to a First Embodiment of the Invention)

Figure 1:
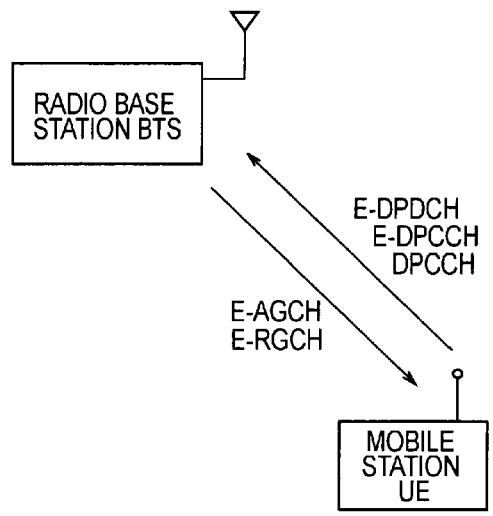
FIG. 1 is an entire configuration diagram of a mobile communication system according to a first embodiment of the invention.
Figure 2:
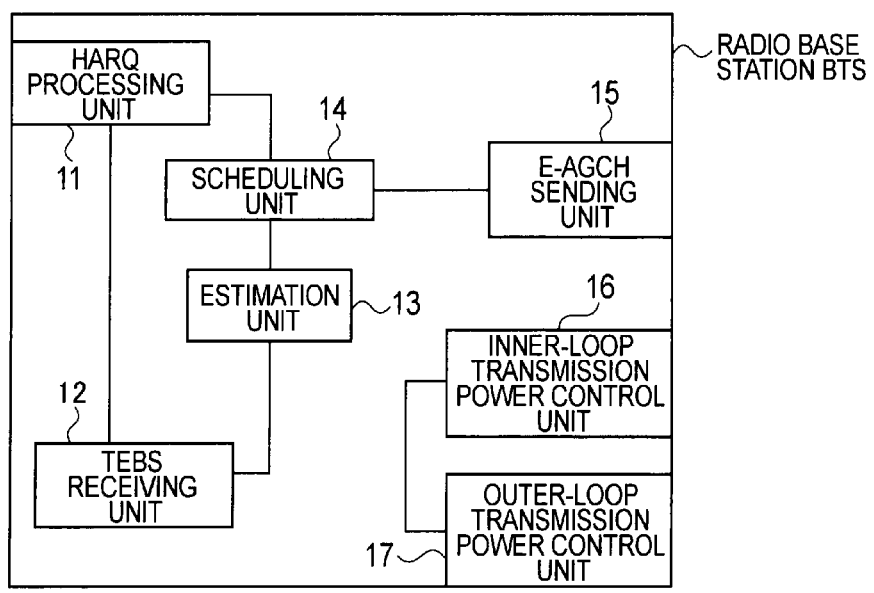
FIG. 2 is a functional block diagram of a radio base station according to the first embodiment of the invention.

Referring to FIGS. 1 and 2, the configuration of a mobile communication system according to a first embodiment of the invention is described.

As shown in FIG. 1, the mobile communication system according to the embodiment is configured to be capable of providing EUL of the "Time and Rate" system between a radio base station BTS and a mobile station UE.

In other words, the mobile communication system according to the embodiment allows the radio base station BTS and the mobile station UE to establish downlink channels such as E-AGCH (E-DCH Absolute Grant Channel), and E-RGCH (E-DCH Relative Grant Channel), and to establish uplink channels such as E-DPDCH (E-DCH Dedicated Physical Data Channel), E-DPCCH (E-DCH Dedicated Physical Control Channel), and DPCCH (Dedicated Physical Control Channel).

Also, in the mobile communication system according to the embodiment, the radio base station BTS may be a radio base station for a femtocell (or radio base station for a home cell).

As shown in FIG. 2, the radio base station BTS includes an HARQ processing unit 11, a TEBS receiving unit 12, an estimation unit 13, a scheduling unit 14, an E-AGCH sending unit 15, an inner-loop transmission power control unit 16, and an outer-loop transmission power control unit 17.

The HARQ processing unit 11 is configured to receive MAC-e PDUs (data signal) each containing one or more MAC-d PDUs (packets) with a fixed size transmitted by the mobile station UE via E-DPDCH using retransmission control in the HARQ system.

Specifically, the HARQ processing unit 11 is configured to return an ACK to the mobile station UE when the HARQ processing unit 11 successfully receives a MAC-e PDU in each HARQ process, and return a NACK to the mobile station UE when the HARQ processing unit 11 fails reception of a MAC-e PDU in each HARQ process.

The inner-loop transmission power control unit 16 is configured to control transmission power of MAC-e PDUs of the mobile station UE based on a target SIR (target reception quality).

For example, the inner-loop transmission power control unit 11 is configured to measure a reception SIR of MAC-e PDUs transmitted by the mobile station UE via E-DPDCH, and, then, send the mobile station a TPC command to increase or decrease the transmission power of the MAC-e PDUs in the mobile station UE so that the reception SIR can be closer to the target SIR.

The outer-loop transmission control unit 13 is configured to control the target SIR based on a target error rate BLER at a predetermined number of retransmissions Nt. For example, the outer-loop transmission power control unit 13 may be configured to control the target SIR based on the target error rate BLER at the number of retransmissions set to 0 (that is, at the first transmission).

The TEBS receiving unit 12 is configured to receive TEES reported by a scheduled mobile station and showing a residual amount of data in the buffer of the mobile station UE.

Here, TEBS is reported as an information element in SI (Scheduling Information) by each mobile station UE.

Also, the scheduling information may be transmitted with being multiplexed with MAC-e PDUs transmitted via E-DP-DCH. Furthermore, the scheduling information may be periodically transmitted.

The estimation unit 13 is configured to estimate a time when the buffer of a mobile station UE will become empty based on the TEBS received by the TEBS receiving unit 12.

The scheduling unit 14 is configured to determine a mobile station to be scheduled in each scheduling assignment slot and determine a scheduling grant information to be transmitted to the determined mobile station to be scheduled.

Also, the scheduling unit 14 can determine to switch between mobile stations UE to be scheduled, based on the time that the estimation unit 13 estimates as a time when the buffer of the scheduled mobile station will become empty.

In other words, the scheduling unit 14 determines to send the scheduled mobile station a "Zero Grant (a first scheduling grant information)" instructing to stop transmission of MAC-e PDUs (data signal) via E-DPDCH (enhanced-dedicated physical data channel), based on the time that the estimation unit 13 estimates as a time when the buffer of the scheduled mobile station will become empty.

The E-AGCH sending unit 15 is configured to send a scheduling grant information (AG or "Zero Grant") determined by the scheduling unit 14 via E-AGCH to the scheduled mobile station determined by the scheduling unit 14.

For example, here, assume that "L" denotes a residual amount of data in the buffer of the mobile station UE; "L1" denotes the number of TTIs required until a "Zero Grant" is reflected in the mobile station UE after transmission of the "Zero Grant" from the radio base station BTS; "N" denotes the number of MAC-d PDUs (packets) contained in MAC-e PDU transmitted in each TTI; "S" denotes the size of a MAC-d PDU; and "BLER" denotes a target BLER (target error ratio) to be described later. Under the above assumptions, the estimation unit 13 may be configured to estimate that the buffer of the mobile station UE will become empty at a time within a period of "T1" after the following formula is determined to be satisfied:

[Expression 1]

$$L \leq \frac{N \times S \times T_1}{1 + BLER}, \quad \text{(Formula 1)}$$

and the E-AGCH sending unit 15 may be configured to send a "Zero Grant" to the mobile station UE.

Here, when determining that the amount of data transmittable from the mobile station UE during "T1" is "L" or larger, the estimation unit 13 estimates that the buffer of the mobile station UE will become empty at a time within a period of "T1" after that time.

In other words, when determining that (Expression A) "L≤TPUT×T1" holds true, the estimation unit 13 estimates that the buffer of the mobile station UE will become empty at a time within the period of "T1" after that time.

Here, "TPUT" is a transmission rate of MAC-d PDUs in the mobile station UE determined in consideration of MAC-e PDUs successfully received in the retransmission after a predetermined number of retransmissions, in other words, a receiving speed (throughput) of MAC-d PDU in the radio base station BTS.

Note that, if an error ratio P (n) at an n-th retransmission satisfies $$\begin{cases} P(n) = 1 & (0 \leq n < Nt) \\ P(n) = BLER & (n = Nt) \\ P(n) = 0 & (Nt > n), \end{cases} \quad \text{[Expression 2]}$$

a reception rate TPUT (throughput) of MAC-d PDUs in the radio base station BTS is calculated by using

[Expression 3]

$$TPUT = \frac{TPUT_{init}}{Nt + BLER + 1} \quad \text{(Expression B)}$$
$$TPUTinit = N \times S.$$

Here, "TPUTinit" is an initial rate of MAC-d PDU in the mobile station UE.

Hereinafter, the description is given of the reason why the reception rate TPUT (throughput) of MAC-d PDUs in the radio base station BTS can be calculated as described above.

For example, if "Nt=0" and "BLER=0.3" are set, and if 10 MAC-d PDUs are transmitted by the mobile station UE during 10 TTIs (in other words, if the number of MAC-d PDUs in each MAC-e PDU is 1 and "TPUTinit=1×s" holds true), the radio base station BTS returns ACK for the successful reception of seven MAC-d PDUs and also returns NACK for the unsuccessful reception of three MAC-e PDUs, out of ten MAC-e PDUs sent at the first transmission.

Next, the radio base station BTS returns ACK for the successful reception of all of the 3 MAC-e PDUs sent in the first retransmission.

Here, if MAC-e PDUs sent in the Nt-th retransmission (for example, for the 0-th retransmission) fail to be received and then are sent at the (Nt+1)-th retransmission (for example, at the first retransmission), the radio base station BTS is assumed to successfully receive all of these MAC-e PDUs.

In such a case, the radio base station BTS can calculate the reception rate TPUT (=10×S/13) of MAC-d PDUs in the radio base station BTS by using "(the number of MAC-e PDUs, for which ACK is returned)×(the number of MAC-d PDUs contained in MAC-e PDU)×(size of MAC-d PDU)/ (total number of transmitted MAC-e PDUs)".

Accordingly, the radio base station BTS can calculate the reception rate TPUT of MAC-d PDUs in the radio base station BTS by "TPUTint/(Nt+BLER+1) (=1×S/(0+0.3+1)=10×S/ 13".

Thus, (Expression 1) is derived based on the (Expression A) and (Expression B). Here, "Nt=0" is assumed.

In addition, the E-AGCH sending unit 15 may be configured to send the "Zero Grant" to a mobile station UE when a radio link with the scheduled mobile station UE becomes out of synchronization and the high-speed uplink communication with the mobile station is terminated.

Also, the E-AGCH sending unit 15 may be configured to send the "Zero Grant" to the mobile station UE when a predetermined timer expires.

(Operation of the Mobile Communication System According to the First Embodiment of the Invention)

Referring to FIGS. 3 and 4, the description is given of the operation of the mobile communication system according to first embodiment of the invention, in particular, the operation of the radio base station BTS according to the first embodiment of the invention.

As shown in FIG. 3, at time t1, the currently-scheduled mobile station UE multiplexes the scheduling information containing TEBS with MAC-e PDU and transmits the MAC-e PDU to the radio base station BTS which manages a serving cell of the mobile station UE, and at time t2, the radio base station BTS receives the MAC-e PDU multiplexed with the scheduling information.

Here, as shown in FIG. 4, the radio base station BTS acquires TEBS contained in the scheduling information multiplexed with the received MAC-e PDU at step S101, and determines at step S102 whether $$L \leq \frac{N \times S \times T_1}{1 + BLER},\quad \text{(Expression 1)}$$

holds true.

Here, "L" denotes a residual amount of data in the buffer of the mobile station UE, "N" denotes the number of MAC-d PDUs contained in MAC-e PDU, "S" denotes the size of MAC-d PDU, and "BLER" denotes a target BLER (target error ratio) of MAC-e PDUs.

Also, as shown in FIG. 3, "T1" is a time period between time t3 when the "Zero Grant" is sent from the radio base station BTS and time t5 when the "Zero Grant" is reflected in the mobile station UE (that is, time t5 when the mobile station UE stops the transmission of MAC-e PDU via E-DPDCH).

If the above described (Expression 1) is determined to be true, the radio base station BTS determines that the buffer of the mobile station UE will become empty at a time between time t3 and time t5, and then sends the "Zero Grant" to the mobile station UE at step S103.

On the other hand, if (Expression 1) is determined not to be true, the radio base station BTS determines that the buffer of the mobile station UE will not become empty at a time between time t3 and time t5, and thus does not send the "Zero Grant" to the mobile station UE. Here, the radio base station BTS may send the mobile station UE an AG (Absolute Grant) via E-AGCH or a RG (Relative Grant) via E-RGCH.
(Advantageous Effects of the Mobile Communication System According to the First Embodiment of the Invention)

According to the mobile communication system according to the first embodiment of the invention, in EUL of the "Time and Rate" system, a radio base station NodeB can estimate a time when the buffer of a currently-scheduled mobile station UE will become empty and send a "Zero Grant" before receiving "TEBS" showing that the buffer of the mobile station UE is empty. In this way, the radio base station can switch mobile stations UE efficiently.

Features of the embodiment may be expressed as follows.

A first feature of the embodiment is a radio base station including: an estimation unit 13 configured to estimate a time when a buffer of a scheduled mobile station will become empty based on TEBS reported by the mobile station UE and showing a residual amount of data in the buffer of the mobile station UE; and an E-AGCH sending unit 15 configured to send the mobile station UE a "Zero Grant (a first scheduling grant information)" based on the estimated time, the "Zero Grant" instructing to stop transmission of MAC-e PDU (a data signal) via E-DPDCH (E-DCH Dedicated Physical Data Channel).

In the first feature of the embodiment, when "L" denotes a residual amount of data in the buffer of the mobile station UE; "T1" denotes a time period required until the "Zero Grant" is reflected in the mobile station UE after the sending of the "Zero Grant" from the radio base station BTS; "N" denotes the number of MAC-d PDUs (packets) contained in MAC-e PDU; "S" denotes the size of MAC-d PDU; and "BLER" denotes a target error ratio of MAC-e PDU,
the estimation unit 13 may estimate that the buffer of the mobile station UE will become empty at a time within a period of "T1" after $$L \leq \frac{N \times S \times T_1}{1 + BLER} \quad \text{[Expression 5]}$$

is determined to be true, and the E-AGCH sending unit 15 may send the "Zero Grant" to the mobile station UE.

Note that the above described operations of the radio base station BTS and the mobile station UE may be implemented by hardware, may be implemented by a software module executed by a processor, or may be implemented by a combination of both.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk drive, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the radio base station BTS and the mobile station UE. Also, the storage medium and the processor may be provided in the radio base station BTS and the mobile station UE as a discrete component.

Hereinabove, the present invention has been described in detail using the above embodiment; however, it is apparent to those skilled in the art that the present invention is not limited to the embodiment described herein. Modifications and variations of the present invention can be made without departing from the scope of the present invention defined by the description of the scope of claims. Thus, what is described herein is for illustrative purpose, and has no intention whatsoever to limit the present invention.
Industrial Applicability As described above, the embodiment can provide a radio base station capable of efficiently switching between mobile stations to be scheduled in high-speed uplink communications in which only one mobile station UE is treated as a mobile station scheduled in each scheduling assignment slot.

The invention claimed is:
1. A radio base station, comprising:
circuitry configured to:
estimate a time when a buffer of a scheduled mobile station becomes empty based on a remaining amount of data in the buffer of the mobile station, the remaining amount reported by the mobile station; and
send the mobile station a first scheduling grant information being for instructing the mobile station to stop transmission of a data signal via transmission resources of an enhanced-dedicated physical data channel based on the estimated time, wherein the first scheduling grant information is sent after the mobile station has already been scheduled for the same transmission resources of the enhanced-dedicated physical data channel, and the circuitry is configured to send the mobile station the first scheduling grant information when determining that an amount of data transmittable from the mobile station during a time period required until the first scheduling grant information is reflected in the mobile station after transmission of the first scheduling grant information from the radio base station, is at least the remaining amount of data in the buffer of the mobile station.

2. The radio base station according to claim 1, wherein the circuitry estimates that the buffer of the mobile station will become empty at a time within "T1" after $$L \le \frac{N \times S \times T_1}{1 + BLER}$$

is determined to be satisfied, where "L" denotes a remaining amount of data in the buffer of the mobile station, "T1" denotes a time required until the first scheduling grant information is reflected in the mobile station after the sending of the first scheduling grant information from the radio base station, "N" denotes the number of packets contained in the data signal, "S" denotes the size of the packet, and "BLER" denotes a target error rate of the data signal, and the circuitry sends the first scheduling grant information to the mobile station.

3. A method implemented by a radio base station, comprising:

estimating a time when a buffer of a scheduled mobile station becomes empty based on a remaining amount of data in the buffer of the mobile station, the remaining amount reported by the mobile station; and sending the mobile station a first scheduling grant information being for instructing the mobile station to stop transmission of a data signal via transmission resources of an enhanced-dedicated physical data channel based on the estimated time, wherein the first scheduling grant information is sent after the mobile station has already been scheduled for the same transmission resources of the enhanced-dedicated physical data channel, and the radio base station sends the mobile station the first scheduling grant information when determining that an amount of data transmittable from the mobile station during a time period required until the first scheduling grant information is reflected in the mobile station after transmission of the first scheduling grant information from the radio base station, is at least the remaining amount of data in the buffer of the mobile station.

4. A non-transitory computer readable medium including compute executable instructions, wherein the instructions, when executed by a base station, cause the base station to perform a method comprising:

estimating a time when a buffer of a scheduled mobile station becomes empty based on a remaining amount of data in the buffer of the mobile station, the remaining amount reported by the mobile station; and sending the mobile station a first scheduling grant information being for instructing the mobile station to stop transmission of a data signal via transmission resources of an enhanced-dedicated physical data channel based on the estimated time, wherein the first scheduling grant information is sent after the mobile station has already been scheduled for the same transmission resources of the enhanced-dedicated physical data channel, and the base station sends the mobile station the first scheduling grant information when determining that an amount of data transmittable from the mobile station during a time period required until the first scheduling grant information is reflected in the mobile station after transmission of the first scheduling grant information from the base station, is at least the remaining amount of data in the buffer of the mobile station.

* * * * *